United States Patent
Shin (10) Patent No.: US 9,521,507 B2
(45) Date of Patent: Dec. 13, 2016

(54) WIRELESS COMMUNICATION SYSTEM, AND APPARATUS AND METHOD FOR CONTROLLING COMMUNICATION CONNECTIONS WITH PLURALITY OF USER TERMINALS IN SYSTEM

(71) Applicant: SK PLANET CO., LTD., Seongnam-si, Gyeonggi-do (KR)

(72) Inventor: Chul Yong Shin, Seoul (KR)

(73) Assignee: SK PLANET CO., LTD., Seongnam-Si, Gyeonggi-Do (KR)

( * ) Notice: Subject to any disclaimer, the term of this patent is extended or adjusted under 35 U.S.C. 154(b) by 140 days.

(21) Appl. No.: 14/522,988

(22) Filed: Oct. 24, 2014

(65) Prior Publication Data

US 2015/0281875 A1 Oct. 1, 2015

(30) Foreign Application Priority Data

Mar. 25, 2014 (KR) .......................... 10-2014-0034926

(51) Int. Cl.
| | | |
|---|---|---|
| H04B 7/00 | (2006.01) |
| H04W 4/00 | (2009.01) |
| H04W 64/00 | (2009.01) |
| H04W 76/06 | (2009.01) |
| H04W 84/18 | (2009.01) |

(52) U.S. Cl.
CPC ............. *H04W 4/008* (2013.01); *H04W 64/00* (2013.01); *H04W 76/066* (2013.01); *H04W 84/18* (2013.01)

(58) Field of Classification Search
CPC .... H04W 84/18; H04W 8/005; H04W 76/023; H04W 48/18; H04W 72/02; H04W 4/008; H04W 4/023; H04W 92/02; H04W 64/00; H04W 4/02; H04W 4/06; H04W 40/00; H04W 40/24; H04W 4/026; H04W 4/027; H04W 4/04; H04W 4/206; H04W 74/02
USPC ........................................................ 455/41.2
See application file for complete search history.

(56) References Cited

U.S. PATENT DOCUMENTS

| | | | |
|---|---|---|---|
| 8,526,884 B1* | 9/2013 | Price .................. H04W 8/005 |
| | | | 455/41.2 |
| 2012/0096138 A1* | 4/2012 | Lambert ........... H04L 29/12254 |
| | | | 709/223 |
| 2014/0179233 A1* | 6/2014 | Kang .................... H04L 67/16 |
| | | | 455/41.2 |

FOREIGN PATENT DOCUMENTS

KR          1020090114018 A     11/2009

* cited by examiner

*Primary Examiner* — Ajibola Akinyemi
(74) *Attorney, Agent, or Firm* — Hauptman Ham, LLP (57) ABSTRACT

A wireless communication system, and an apparatus and method for controlling communication connections with a plurality of user terminals in the system are disclosed. The terminal device includes a communication unit, a storage unit, and a control unit. The communication unit receives a signal, broadcast by at least one beacon device, via wireless communication. The storage unit stores data that is transmitted and received to and from the beacon device. The control unit is functionally connected with the communication unit, scans a signal transmitted from the beacon device, performs an operation for a communication connection with the beacon device using the scanned signal, receives a bit mask via the communication unit and also stores the bit mask in the storage unit when the communication connection has been established, transmits data to the beacon device via the communication unit, and immediately releases the communication connection.

8 Claims, 6 Drawing Sheets

WIRELESS COMMUNICATION SYSTEM, AND APPARATUS AND METHOD FOR CONTROLLING COMMUNICATION CONNECTIONS WITH PLURALITY OF USER TERMINALS IN SYSTEM

CROSS-REFERENCE TO RELATED APPLICATION

This application claims the benefit of Korean Patent Application No. 10-2014-0034926, filed Mar. 25, 2014, which is hereby incorporated by reference herein in its entirety.

BACKGROUND

1. Technical Field

The present disclosure relates generally to wireless communication service and, more particularly, to a wireless communication system, and an apparatus and method for controlling communication connections with a plurality of user terminals in the system, which are capable of minimizing connection time upon establishing communication connections between a beacon device and a plurality of terminal devices via wireless communication, thereby preventing the terminal devices from missing beacon signals broadcast by the beacon device.

2. Description of the Related Art

This section is not intended to be an admission of prior art, but is intended to simply provide background information related to embodiments.

With the development of mobile communication networks and the advancement of terminal specifications, mobile communication terminals have become the necessities of people today and are evolving into total entertainment devices, beyond the scope of conventional simple communication devices or information provision devices.

Furthermore, technologies for enabling mobile communication terminals to perform short-range wireless communication over a short distance have rapidly developed. One of these short-range wireless communication technologies is a Bluetooth communication technology.

The Bluetooth communication technology has evolved continuously. Recently, Bluetooth Low Energy (BLE) is being widely used in the fields of smart phones, geofencing, mobile payment, etc. BLE consumes lower power than the standard Bluetooth wireless connection technology, and is most recently being chiefly used in various services using short-range wireless communication.

However, a beacon device for performing short-range wireless communication using Bluetooth Low Energy (BLE) announces its presence via continuous broadcasting. A terminal device may receive a broadcast beacon signal, may establish a communication connection with the beacon device, and then may transmit required data.

A problem arises in that, when a communication connection between the terminal device and the beacon device has been established in this manner, the beacon device cannot broadcast a beacon signal anymore, and thus a situation occurs in which another terminal device cannot identify the beacon device when the other terminal device approaches the beacon device.

SUMMARY

In order to overcome a problem in which, as a communication connection between a terminal device and a beacon device has been established, the beacon device cannot broadcast a beacon signal anymore and thus another terminal device cannot identify the beacon device, at least one embodiment of the present invention is intended to provide a wireless communication system, and an apparatus and method for controlling communication connections with a plurality of user terminals in the system, in which a beacon device can release a communication connection immediately after establishing the communication connection and then receiving required data, thereby enabling communication connections with other terminal devices.

At least one embodiment of the present invention is intended to provide a wireless communication system, and an apparatus and method for controlling communication connections with a plurality of user terminals in the system, in which a beacon device can release a communication connection immediately after establishing the communication connection with a terminal device and then receiving required data, can process the received data, and then can establish a communication connection again with the corresponding terminal device via another type of broadcasting in order to provide notification of the completion of the processing of the data, so that the corresponding terminal device can receive the result of the processing.

In accordance with an aspect of the present invention, there is provided a terminal device, including a communication unit configured to receive a signal, broadcast by at least one beacon device, via wireless communication; a storage unit configured to store data that is transmitted and received to and from the beacon device; and a control unit functionally connected with the communication unit, and configured to scan the signal transmitted from the beacon device, perform an operation for a communication connection with the beacon device using the scanned signal, receive a bit mask, transmitted from the beacon device, via the communication unit and also store the bit mask in the storage unit when the communication connection has been established, transmit data to be transmitted to the beacon device via the communication unit, and immediately release the communication connection.

The bit mask may be a value indicative of a sequential position required for a reconnection.

In the terminal device, the control unit may be further configured to check the value of the bit mask included in a received notification signal providing notification of the completion of processing when the control unit has received the notification signal, broadcast by the beacon device, via the communication unit; and perform the operation for the communication connection with the beacon device if the value of the bit mask included in the received notification signal is a value indicative of a case where the terminal device currently requires a connection with the beacon device.

In the terminal device, the control unit may be further configured to request the result of processing of data from the beacon device via the communication unit when a communication connection has been established in response to a request for a connection from the beacon device; and release the communication connection when the result of the processing of the data has been received from the beacon device.

In accordance with another aspect of the present invention, there is provided a beacon device, including a beacon communication unit configured to communicate with at least one terminal device via wireless communication; and a beacon control unit configured to assign a bit mask and also transmit the assigned bit mask to the terminal device via the beacon communication unit when a communication connection with the terminal device has been established, and to immediately release the communication connection if data reception from the terminal device via the beacon communication unit is completed.

The beacon device may further include a beacon storage unit configured to store data that is transmitted and received to and from the terminal device; the beacon control unit may be configured to store data in the queue of the beacon storage unit when the data has been received from the terminal device via the beacon communication unit, process the data stored in the queue, change the value of the bit mask assigned to the terminal device to a value indicative of a case where a connection is required when the processing of the data has been completed, and broadcast a signal including the changed bit mask via the beacon communication unit.

The signal including the changed bit mask may be a signal providing notification of the completion of the processing of the data transmitted to the terminal device.

In the beacon device, the beacon control unit may be further configured to transmit the result of the processing of the data via the beacon communication unit and then immediately release the communication connection when the result of the processing of the data is requested by the terminal device via the beacon communication unit.

In accordance with still another aspect of the present invention, there is provided a communication system, including a beacon device configured to assign a bit mask and also transmit the assigned bit mask to a terminal device when a communication connection with the terminal device has been established, to immediately release the communication connection if the reception of data from the terminal device has been completed, to store the data received from the terminal device in a queue, to process the data stored in the queue, to change the value of the bit mask assigned to the terminal device to a value indicative of a case where a connection is required when the processing of the data has been completed, and to broadcast a signal including the changed bit mask; and the terminal device configured to receive the bit mask transmitted from the beacon device and also store the received bit mask when the communication connection with the beacon device has been established, to transmit data to be transmitted to the beacon device and immediately release the communication connection with the beacon device, to check the value of the bit mask included in a notification signal if the notification signal providing notification of the completion of the processing broadcast by the beacon device has been received, and to perform a operation for a communication connection with the beacon device if the value of the bit mask included in the notification signal is a value indicative of a case where the terminal device currently requires a connection with the beacon device.

In accordance with still another aspect of the present invention, there is provided a method of controlling communication connections with a plurality of user terminals including, by a terminal device, executing a module for wireless communication in response to manipulation of a user; after the module for wireless communication has been executed, scanning a beacon signal, and identifying a beacon device when receiving a beacon signal broadcast by the beacon device; performing an operation for a communication connection after the beacon device has been identified; receiving and storing a bit mask required for a reconnection from the beacon device when the communication connection with the beacon device has been established; and transmitting data to be transmitted to the beacon device, and immediately releasing the communication connection.

The method may further include, by the terminal device, receiving a signal providing notification of the completion of processing broadcast by the beacon device after the communication connection has been released; and checking the value of a bit mask included in the received signal, and performing an operation for a communication connection with the beacon device if the value of the bit mask included in the received signal is a value indicative of a case where the terminal device currently requires a communication connection with the beacon device.

The method may further include, by the terminal device, after performing the operation for a communication connection with the beacon device, requesting the result of the processing of the transmitted data when the communication connection with the beacon device has been established; and releasing the communication connection with the beacon device when the result of the processing of the data has been received from the beacon device.

The method may further include, by the terminal device, outputting the result of processing received from the beacon device so that a user can check the result of processing.

The signal providing notification of the completion of processing broadcast by the beacon device is a signal which is received as a Generic Attribute Profile (GATT) regarding whether a connection is required and in which the value of the bit mask has been included as "1."

In accordance with still another aspect of the present invention, there is provided a method of controlling communication connections with a plurality of user terminals, including, by a beacon device, broadcasting a beacon signal as a signal providing notification of its presence; performing an operation for a communication connection in response to a request for the communication connection from a terminal device; assigning a bit mask, indicative of whether to establish a reconnection, to the terminal device with which the communication connection has been established, and transmitting the assigned bit mask; and storing a data in a queue and releasing the communication connection when receiving the data from the terminal device.

The method may include, by a beacon device, processing the data stored in the queue when the communication connection has been released; broadcasting a signal proving notification of the completion of the processing of the received data depending on whether to require a connection when the processing of the data has been completed; establishing a communication connection with the terminal device when the terminal device that has received the broadcast signal providing notification of the completion of the processing requests the communication connection; receiving the request for the result of the processing from the terminal device when the communication connection with the terminal device has been established; and transmitting the requested result of the processing of the data to the terminal device, and then releasing the communication connection with the terminal device.

In accordance with still another aspect of the present invention, there is provided a computer-readable storage medium having stored therein computer-readable program instructions that, when executed by a computer, cause the computer to execute a method of controlling communication connections with a plurality of user terminals.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Embodiments of the present invention will be described in detail below with reference to the accompanying drawings. Detailed descriptions of well-known functions and configurations that would make the gist of the present invention obscure will be omitted. Furthermore, it should be noted that the same elements will be designated by the same reference numerals throughout the accompanying drawings as much as possible.

Terms and words that are described below and used in the present specification and the claims should not be interpreted as having common and dictionary meanings, but should be interpreted as having meanings and concepts in accordance with the technical spirit of the present invention based on the principle in which an inventor can appropriately define the concepts of terms to describe his or her invention in the most appropriate way. Accordingly, since configurations illustrated in embodiments described herein and the accompanying drawings correspond merely to embodiments of the present invention and do not represent the overall technical spirit of the present invention, it should be understood that various equivalents and modifications that may replace the configurations at the time when the present application is filed.

First, a wireless communication system according to an embodiment of the present invention is described in detail with reference to the accompanying drawings.

Figure 1:
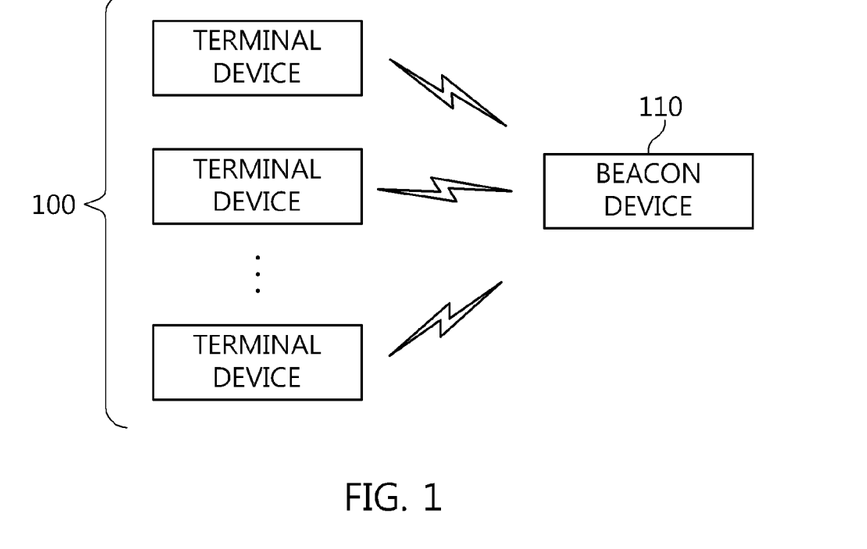
FIG. 1 is a diagram illustrating the configuration of a wireless communication system according to an embodiment of the present invention.

FIG. 1 is a diagram illustrating the configuration of the wireless communication system according to this embodiment of the present invention.

Referring to FIG. 1, the wireless communication system for controlling communication connections with a plurality of user terminals may be configured to include at least one terminal device 100 and a beacon device 110.

The terminal device 100 refers to a terminal that can communicate with the beacon device 110 using wireless communication and can transmit and receive various types of data. The terminal device 100 may be any one of a tablet Personal Computer (PC), a laptop, a PC, a smart phone, a Portable Digital Assistant (PDA), a smart TV, a mobile communication terminal, etc.

Furthermore, the terminal device 100 is a terminal device that is capable of wireless communication (for example, Bluetooth Low Energy (BLE) communication, Wi-Fi communication, Bluetooth communication, Radio Frequency Identification (RFID) communication, Near Field Communication (NFC) or the like). The terminal device 100 may connect with the beacon device 110 via wireless communication and then transmit or receive data. In this embodiment of the present invention, BLE communication is described below as an example. In this case, it should be noted that this embodiment of the present invention is not limited to a BLE communication method, but may use any type of communication method as long as the method can perform wireless communication.

This terminal device 100 may scan a beacon signal broadcast by the beacon device 110, and may identify a beacon device 200 to be connected using the scanned beacon signal. For this purpose, the terminal device 100 may receive an application capable of identifying the beacon device 110 from a service device (not illustrated in drawings), may install the application, may execute the application, and then may scan a BLE beacon signal. Furthermore, the terminal device 100 may connect communication with the beacon device 110 using a beacon signal received from the identified beacon device 110.

In particular, the terminal device 100 according to an embodiment of the present invention executes a communication processing module in response to the manipulation of a user, scans a beacon signal, receives the beacon signal broadcast by the beacon device 110, and then identifies the beacon device 110. Thereafter, the terminal device 100 identifies the beacon device 110, and then performs an operation of establishing a communication connection. In an embodiment of the present invention, since signals transmitted and received and a specific operation performed for a communication connection between the terminal device 100 and the beacon device 110 are based on a general communication connection operation, detailed descriptions thereof are omitted.

After the communication connection has been established between the terminal device 100 and the beacon device 110, the terminal device 100 receives a bit mask for a reconnection from the beacon device 110, and then stores the bit mask for the determination of whether to establish a reconnection.

Thereafter, the terminal device 100 releases the communication connection immediately after transmitting data to be transmitted to the beacon device 110. In this case, the communication connection may be released by the terminal device 100, or by the beacon device 110 that has received the data.

Furthermore, the terminal device 100 receives a signal providing notification of the completion of the processing broadcast by the beacon device 110. Since a reconnection is required if the value of the received bit mask is 1, the terminal device 100 performs an operation required for a communication connection with the beacon device 110. In this case, the signal providing notification of the completion of the processing broadcast by the beacon device 110 is a signal that is received as a Generic Attribute Profile (GATT) regarding whether a connection is required. The signal will be transmitted with the sequential position of a bit mask included as "1."

If a communication connection has been established between the terminal device 100 and the beacon device 110, the terminal device 100 requests the result of the processing of the data, receives the result of the processing of the data from the beacon device 110, and then releases the communication connection with the beacon device 110.

Thereafter, the terminal device 100 outputs the received result of the processing so that the user can check the received result of the processing.

The beacon device 110 according to this embodiment of the present invention may be located in a store, and may perform BLE communication with the at least one terminal device 100. The beacon device 110 may broadcast a beacon signal including unique identification information, i.e., presence information, to the terminal device 100.

In particular, for the sake of minimizing the connection time to process the data of a plurality of terminal devices 100, the beacon device 110 according to this embodiment of the present invention assigns one bit to each of the terminal devices 100 during a communication connection with a specific terminal device 100, receives required data, and immediately terminates communication. In this case, the one bit may be provided in the form of a bit mask.

Furthermore, the beacon device 110 stores the received data in a queue, processes the data stored in the queue, changes the sequential position of the bit mask, provided by the corresponding terminal device 100, to "true," and then transmits a notification requesting the terminal device 100 to receive the result of the processing of the transmitted data. That is, when the data processing has been completed, the beacon device 110 broadcasts a signal providing notification of the completion of the processing of the received data depending on whether a connection is required. In this case, the beacon device 110 changes the bit mask to "1" in order to change the sequential position of bit mask to "true" and then broadcasts a notification signal with the value of a bit mask set to "1."

Thereafter, the beacon device 110 establishes a communication connection with the terminal device 100 in response to a request for a communication connection from the terminal device 100, which has received the broadcast signal providing notification of the completion of the processing.

When receiving the request for the result of the processing from the terminal device 100 after the communication connection has been established, the beacon device 110 transmits the requested result of the processing of the data to the terminal device 100, and then releases the communication connection with the terminal device 100.

That is, the beacon device 110 according to this embodiment according to the present invention alternately broadcasts a signal providing notification of its presence and a signal providing notification of the completion of the processing of received data.

As described above, the beacon device 110 establishes a communication connection with a specific terminal device, holds the communication connection only until the time when the beacon device 110 has received data from the terminal device, and terminates the communication connection after the reception has been completed. Furthermore, the received data is stacked in a queue. The beacon device 110 processes the data stacked in the queue, broadcasts a notification signal providing notification of the completion of the processing to the corresponding terminal device, establishes a communication connection again with the terminal device, provides the result of the processing, and immediately terminates the communication connection.

That is, since the communication connection with the specific terminal device is terminated after the reception of the data has been completed, data can be transmitted and received via a communication connection with another terminal device until the former data is processed and a communication connection with the terminal device is established again.

Accordingly, communication connection time is minimized, thereby enabling a plurality of terminal devices to receive broadcast beacon signals providing notification of its presence from the beacon device 110.

If the broadcasting of the beacon device is performed in this way, a maximum of 20 bytes are available, and thus data (160 bits) for 160 users can be processed.

The configuration of the terminal device according to an embodiment of the present invention in the wireless communication system configured as described above is described in detail below with reference to the accompanying drawings.

Figure 2:
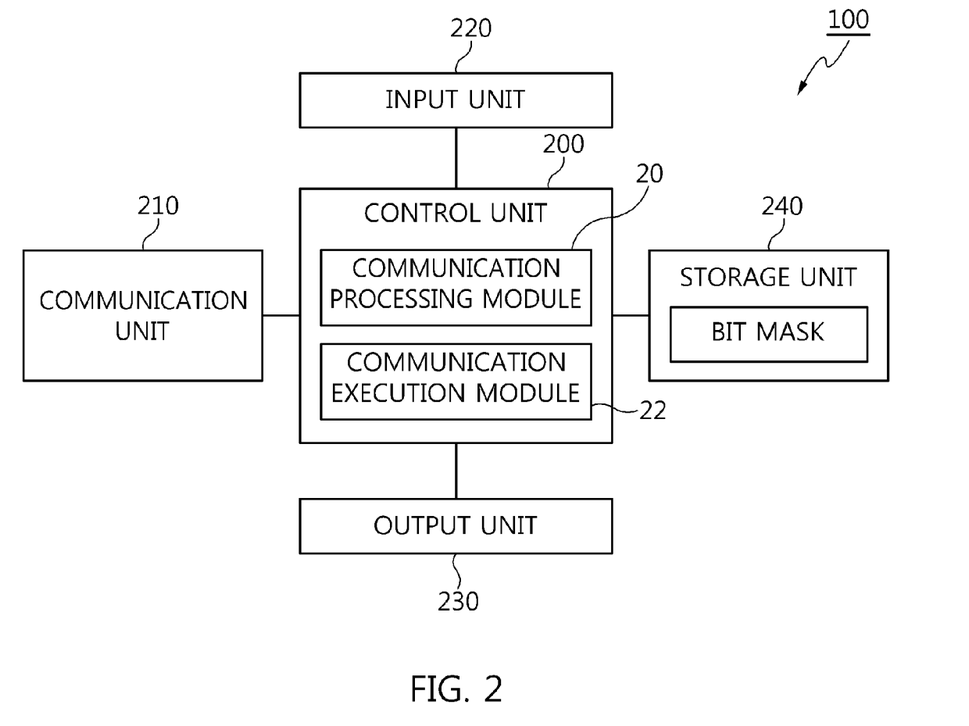
FIG. 2 is a diagram illustrating the configuration of a terminal device according to an embodiment of the present invention.

FIG. 2 is a diagram illustrating the configuration of the terminal device according to this embodiment of the present invention.

Referring to FIG. 2, the terminal device 100 may be configured to include a control unit 200, a communication unit 210, an input unit 220, an output unit 230, and a storage unit 240.

The control unit 200 may perform the overall control of the terminal device 100, and, in particular, may control BLE communication with the beacon device 110 and control a communication connection using a beacon signal generated by the beacon device 110. For this purpose, the control unit 200 may be configured to include a communication processing module 20, and a communication execution module 22.

The communication processing module 20 according to this embodiment of the present invention may control the communication unit 210 for the performance of wireless communication in conjunction with the beacon device 110, may scan a beacon signal broadcast by the beacon device 110, and then may transfer the scanned beacon signal to the communication execution module 22. Furthermore, the communication processing module 20 may check identification information included in the scanned beacon signal, may control the identification of the beacon device 110, and may perform the procedure of a communication connection with the identified beacon device 110. For example, the communication processing module 20 processes data transmitted and received via the communication unit 210 based on a protocol according to any one of BLE communication, Wi-Fi communication, Bluetooth communication, RFID communication and NFC.

The communication execution module 22 according to this embodiment of the present invention stores a bit mask required for a reconnection, which is included in the beacon signal received from the communication processing module 20, to the storage unit 240.

Thereafter, the communication execution module 22 transmits data to be transmitted to the beacon device 110 via the communication unit 210, and immediately releases the communication connection. In this case, the communication connection may be released by the communication execution module 22 of the terminal device 100, or by the beacon device 110 that has received the data.

Furthermore, the communication execution module 22 performs an operation for a communication connection with the beacon device 110 because a reconnection is required if the bit mask value of the beacon signal received from the processing module 20 is 1 in order to provide notification of the completion of processing.

Thereafter, if a communication connection has been established between the terminal device 100 and the beacon device 110, the communication execution module 22 requests the beacon device 110 to transmit the result of the processing via the communication unit 210. If the communication execution module 22 has received the result of the processing of data from the beacon device 110 via the communication unit 210, the communication execution module 22 releases the communication connection with the beacon device 110.

Thereafter, the communication execution module 22 outputs the received result of the processing via the output unit 230 so that a user can check the received result of the processing.

The communication unit 210 may transmit or receive data using not only wired and wireless communication methods but also various communication methods. Furthermore, the communication unit 210 may transmit and receive data using one or more communication methods. For this purpose, the communication unit 210 may include a plurality of communication modules that transmit and receive data using different communication methods, respectively. In particular, the communication unit 210 according to this embodiment of the present invention may transmit and receive messages related to the performance of wireless communication (for example, BLE communication) to and from the beacon device 110.

The input unit 220 may generate an input signal of a user corresponding to the request or information of the user in response to the manipulation of the user, and may be implemented as various input means (for example, including not only a general input device, such as a keyboard, a mouse, a joy stick, a touch screen or a touch pad, but also gesture input means that detects the motion of the user and then generates a specific input signal) that have been currently commercialized or will be commercialized in the future. In particular, the input unit 120 according to this embodiment of the present invention may generate a Bluetooth communication execution (Bluetooth On) input signal, and an application execution input signal for communication.

The output unit 230 is a means for providing the operation result or state of the terminal device 100 so that a user can check the operation result or the state. For example, the output unit 230 may include a display unit for performing visual output via a screen, a speaker for performing the output of audible sounds, or the like. In particular, the terminal device 100 according to this embodiment of the present invention may output a screen that enables the operations of the ON and OFF of BLE communication.

The storage unit 240 stores information required for the operation of the terminal device 100. In particular, the storage unit 240 according to this embodiment of the present invention may store a scanned beacon signal and a bit mask received from the beacon device 110. This storage unit 240 includes: magnetic media, such as a hard disk, a floppy disk and a magnetic tape; optical media, such as Compact Disk Read-Only Memory (CD-ROM) and a Digital Video Disk (DVD); magneto-optical media, such as a floptical disk; Read-Only Memory (ROM); Random Access Memory (RAM); and flash memory.

Furthermore, the storage unit 240 according to an embodiment of the present invention stores an application program required to perform a function, and a screen image to be output onto the display unit of the output unit 230. Furthermore, the storage unit 240 may store a key map and a menu map for the operation of a touch screen when the display unit is implemented as the touch screen. In this case, each of the key map and the menu map may have various forms. This storage unit 240 may store an Operating System (OS) for booting the terminal device 100 and operating the above-described configurations, application programs for supporting various user functions, etc.

Further, the configuration of the beacon device in the wireless communication system according to an embodiment of the present invention is described in detail below with reference to the accompanying drawings.

Figure 3:
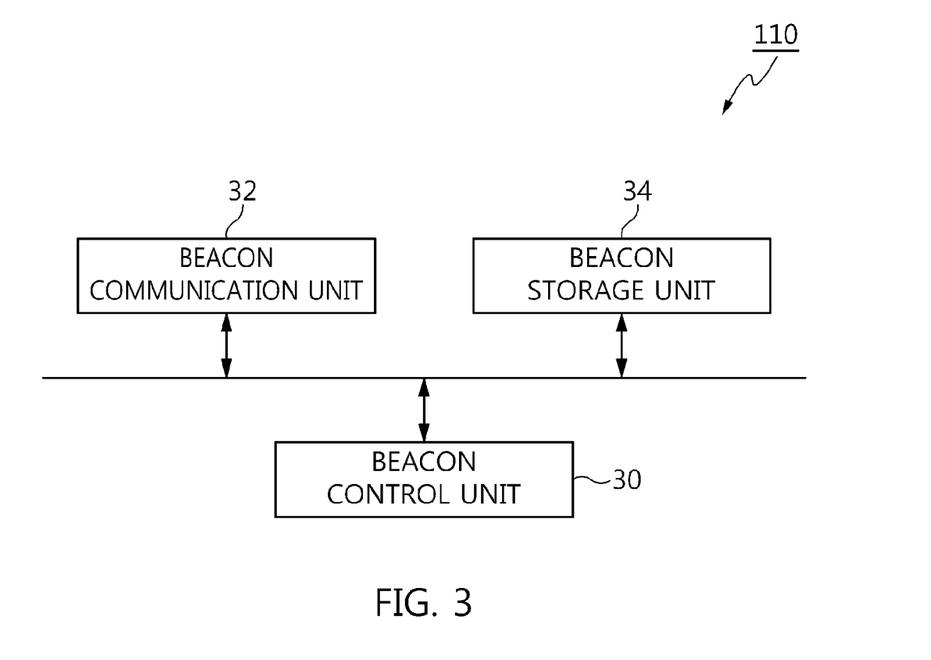
FIG. 3 is a diagram illustrating the configuration of a beacon device according to an embodiment of the present invention.

FIG. 3 is a diagram illustrating the configuration of the beacon device according to this embodiment of the present invention.

Referring to FIG. 3, the beacon device 110 may be configured to include a beacon control unit 30, a beacon communication unit 32, and a beacon storage unit 34.

The beacon control unit 30 is functionally connected with the beacon communication unit 32, and then controls an operation for a communication connection between the beacon device 10 and the terminal device 100. For this purpose, the beacon control unit 30 broadcasts a beacon signal including unique identification information, that is, presence information, to at least one terminal device 100. In this case, if the beacon control unit 30 has received a request for a communication connection from the terminal device 100 via the beacon communication unit 32, the beacon control unit 30 performs an operation for a communication connection with the corresponding terminal device 100, and then establishes the communication connection.

Thereafter, the beacon control unit 30 assigns a bit mask to the terminal device 100, receives required data, and immediately terminates communication.

Furthermore, the beacon control unit 30 stores the received data in the queue of the beacon storage unit 34. When the processing of data stored in the queue has been completed, the beacon control unit 30 broadcasts a notification signal, in which the value of a bit mask stored in the corresponding terminal device 100 has been included as "1," via the beacon communication unit 34 in order to provide notification of the completion of the processing of the received data depending on whether a connection is required.

Thereafter, if the beacon control unit 30 has received a request for a communication connection via the beacon communication unit 32 from the terminal device 100, which has received a signal providing notification of the completion of processing, the beacon control unit 30 establishes a communication connection with the corresponding terminal device 100.

When the beacon control unit 30 has received the request for the result of the processing from the terminal device 100 via the beacon communication unit 32 after the communication connection has been established, the beacon control unit 30 transmits the requested result of the processing of data to the terminal device 100 via the beacon communication unit 32. Thereafter, the beacon control unit 30 releases the communication connection with the terminal device 100.

The beacon communication unit 32 may perform BLE communication with at least one terminal device 100.

The beacon storage unit 34 stores data, received from the terminal device 100, in a queue. This beacon storage unit 34 includes: magnetic media, such as a hard disk, a floppy disk and a magnetic tape; optical media, such as Compact Disk Read-Only Memory (CD-ROM) and a Digital Video Disk (DVD); magneto-optical media, such as a floptical disk; Read-Only Memory (ROM); Random Access Memory (RAM); and flash memory.

A method of controlling communication connections with a plurality of user terminals in the wireless communication system configured as described above is described in detail with reference to the accompanying drawings.

First, the flow of signals transmitted and received between the beacon device and the terminal device that are used to control communication connections with the plurality of user terminals in the wireless communication system according to an embodiment of the present invention is described.

Figure 4:
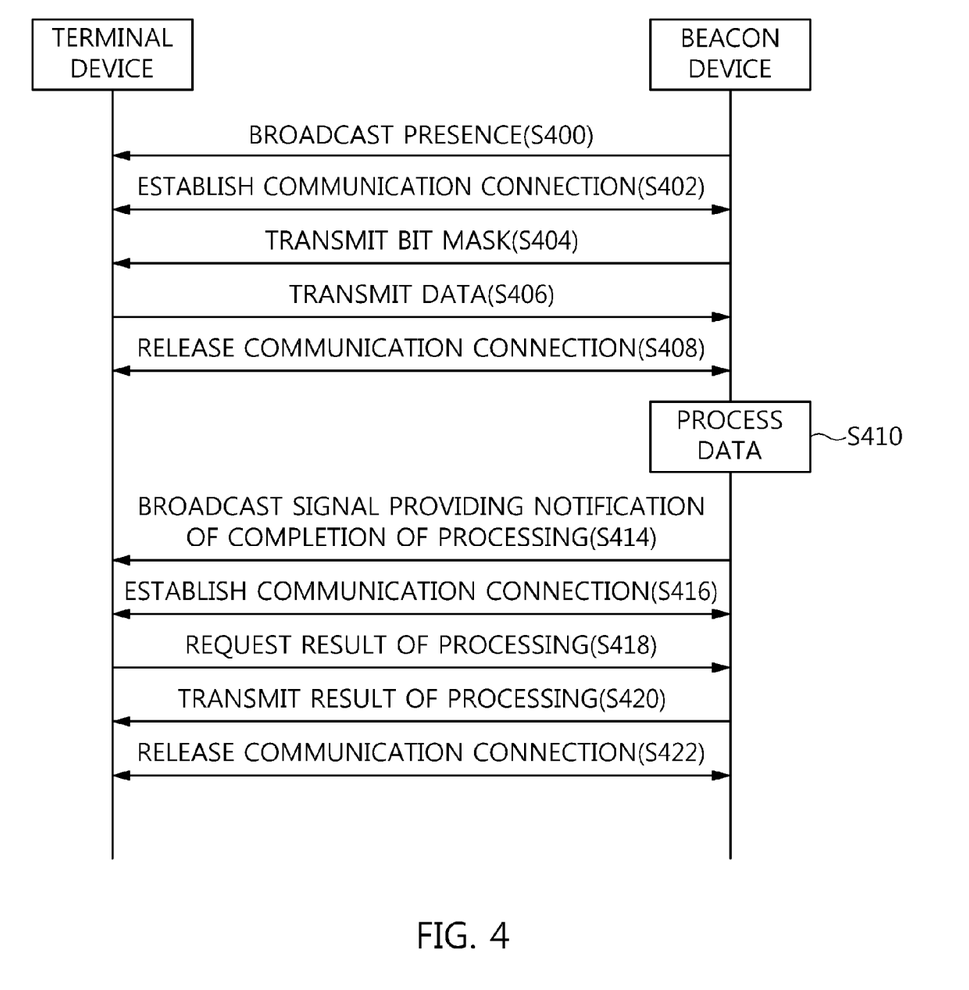
FIG. 4 is a diagram illustrating the flow of signals between a beacon device and a terminal device that are used to control communication connections with a plurality of user terminals in the wireless communication system according to the embodiment of the present invention.

FIG. 4 is a diagram illustrating the flow of signals between the beacon device and the terminal device that are used to control communication connections with the plurality of user terminals in the wireless communication system according to this embodiment of the present invention.

Referring to FIG. 4, at step S400, the beacon device 110 broadcasts a beacon signal as a signal providing notification of its presence.

The terminal device 100 executes a communication processing module 20 in response to the manipulation of a user, scans a beacon signal, receives the beacon signal broadcast by the beacon device 110, and then identifies the beacon device 110. Thereafter, at step S402, the terminal device 100 indentifies the beacon device 110, and then performs an operation for a communication connection.

At step S404, after the communication connection between the terminal device 100 and the beacon device 110 has been established, the beacon device 110 transmits a bit mask required for a reconnection to the terminal device 100 with which the communication connection has been established.

Thereafter, at steps S406 to S408, the terminal device 100 transmits data to be transmitted to the beacon device 110, and immediately releases the communication connection.

At step S410, the beacon device 110 stores the received data in the queue of the beacon storage unit 34, and then processes the data stored in the queue. At step S414, the beacon device 110 broadcasts a signal providing notification of the completion of the processing of the received data. In this case, the signal providing notification of the completion of the processing refers to a signal that has the sequential position of a bit mask changed to "1" and provides notification requesting the terminal device 100 to receive the result of the processing of the transmitted data.

At steps S416 to S418, the terminal device 100 that has received the broadcast signal providing notification of the completion of the processing performs an operation for the communication connection with the beacon device 110, and requests the result of the processing after the communication connection has been established.

At steps S420 to S422, the beacon device 110 that has received the request for the result of the processing transmits the result of the processing of the data, and the terminal device 100 that has received the result of the processing releases the communication connection.

Thereafter, the terminal device 100 may output the received result of the processing so that the user can check the received result of the processing.

Figure 5:
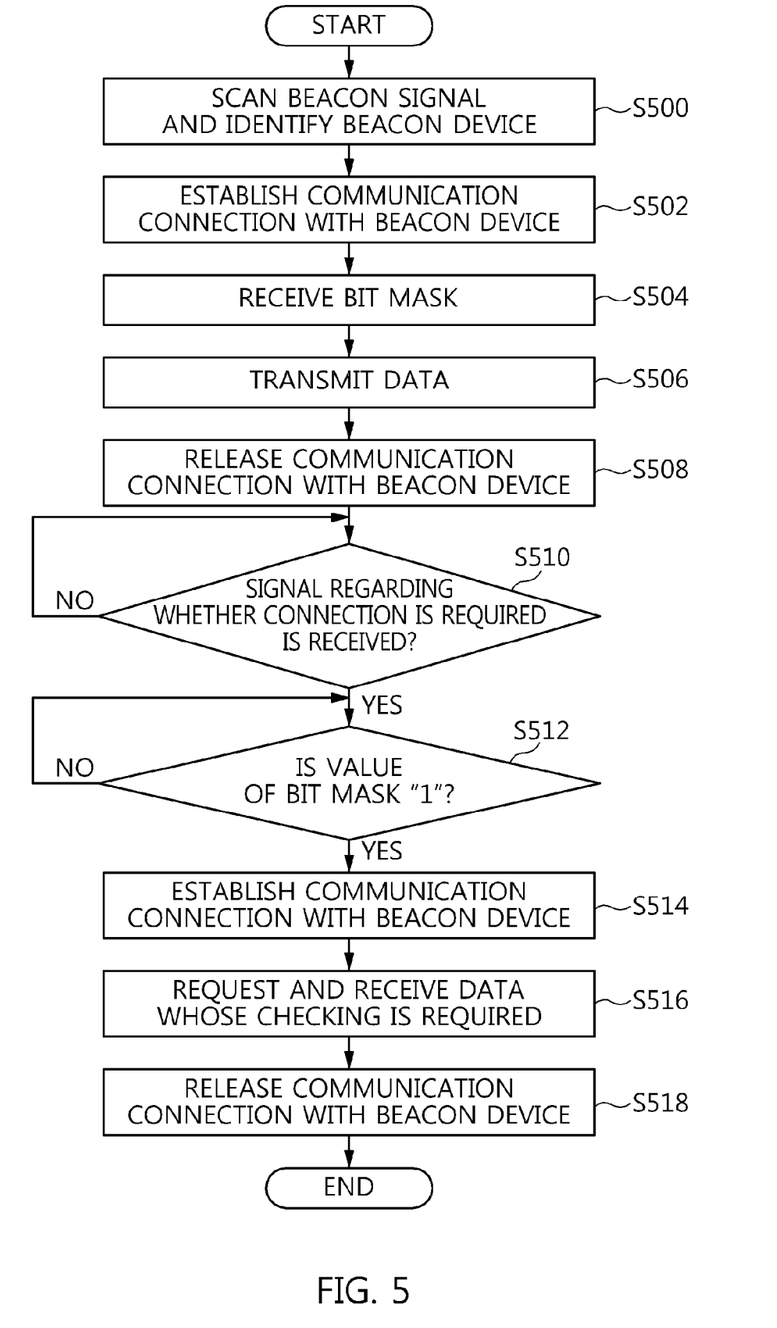
FIG. 5 is a flowchart illustrating a process of controlling communication connections with a plurality of user terminals in the terminal device according to an embodiment of the present invention.

Thereafter, a method of controlling the communication connections of the terminal device with a plurality of user terminals according to an embodiment of the present invention is described FIG. 5 is a flowchart illustrating the method of controlling the communication connections of the terminal device with a plurality of user terminals according to this embodiment of the present invention.

At step S500, the terminal device 100 executes the communication processing module 20 in response to the manipulation of a user, scans a beacon signal, receives the beacon signal broadcast by the beacon device 110, and then identifies the beacon device 110.

Thereafter, at step S502, the terminal device 100 performs an operation for a communication connection after indentifying the beacon device 110.

At step S504, after the communication connection between the terminal device 100 and the beacon device 110 has been established, the terminal device 100 receives a bit mask required for a reconnection from the beacon device 110.

At steps S506 to S508, the terminal device 100 transmits data to be transmitted to the beacon device 110, and immediately releases the communication connection. In this case, the communication connection may be released by the terminal device 100, or by the beacon device 110 that has received the data.

Thereafter, at steps S510 to S514, the terminal device 100 receives a signal providing notification of the completion of the processing broadcast by the beacon device 110, and performs an operation for a communication connection with the beacon device 110 if the value of its bit mask is "1." In this case, the signal providing notification of the completion of the processing broadcast by the beacon device 110 is a signal that is received as Generic Attribute Profile (GATT) regarding whether a connection is required. The signal providing notification of the completion of the processing is transmitted with the sequential position of a bit mask included as "1."

At steps S516 to S518, after the communication connection between the terminal device 100 and the beacon device 110 has been established, the terminal device 100 requests the result of the processing, receives the result of the processing of data from beacon device 110, and then releases the communication connection with the beacon device 110.

Thereafter, the terminal device 100 may output the received result of the processing so that the user can check the received result of the processing.

Finally, a method of controlling communication connections of the beacon device with a plurality of user terminals according to an embodiment of the present invention is described.

Figure 6:
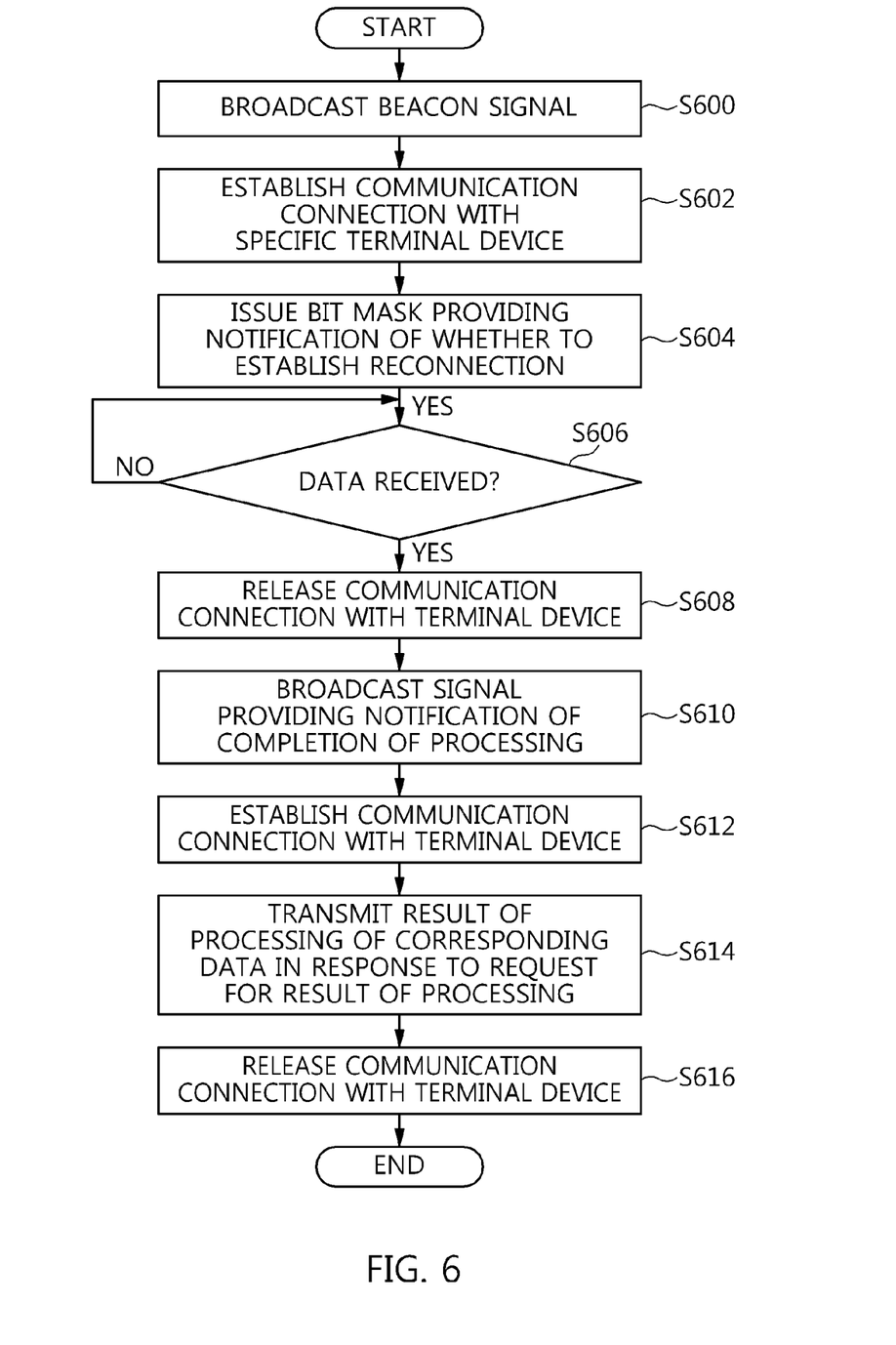
FIG. 6 is a flowchart illustrating a process of controlling communication connections with a plurality of user terminals in the beacon device according to an embodiment of the present invention.

FIG. 6 is a flowchart illustrating the method of controlling communication connections of the beacon device with a plurality of user terminals according to this embodiment of the present invention.

At step S600, the beacon device 110 broadcasts a beacon signal as a signal providing notification of its presence.

At steps S602 to S604, the beacon device 110 performs an operation for a communication connection in response to a request for a communication connection from a specific terminal device 100 that has received the beacon signal, and issues information about a bit mask, providing notification of whether to establish a reconnection, to the terminal device 100 when the communication connection has been established.

Thereafter, if the beacon device 110 has received data from the terminal device 100 at step S606, the beacon device 110 stores the received data in the queue of the beacon storage unit 34 and then releases the communication connection at step S608.

At step S610, the beacon device 110 processes the data stored in the queue if the communication connection has been released, and broadcasts a signal providing notification of the completion of the processing of the received data when the processing of the data has been completed. In this case, the signal providing notification of the completion of the processing is a signal that has the sequential position of a bit mask changed to "1" and provides requesting the terminal device 100 to receive the result of the processing of the transmitted data.

Thereafter, at step S612, the beacon device 110 establishes a communication connection with the terminal device 100 in response to a request for a communication connection from terminal device 100 that has received the broadcast signal providing notification of the completion of the processing.

At step S614, when the beacon device 110 has received a request for the result of processing from the terminal device 100 after the communication connection has been established, the beacon device 110 transmits the requested result of the processing of data to the terminal device 100.

Thereafter, at step S616, the beacon device 110 releases the communication connection with the terminal device 100.

Meanwhile, program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, for example, magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. The hardware devices may be configured to operate as one or more software modules in order to perform the operation of the present invention, and the vice versa.

Furthermore, a computer program (also known as a program, software, a software application, a script, or code) that is installed on an apparatus according to the present disclosure and is used to perform a method according to the present disclosure may be written in any form of programming language, including a compiled or interpreted language or an a priori or procedural language, and may be deployed in any form, including a stand-alone program, a module, a component, a subroutine, or any other unit suitable for use in a computing environment. The computer program does not necessarily correspond to a file in a file system. The program may be stored in a single file provided to a requested program, in multiple interactive files (for example, files each storing one or more modules, a subordinate program or part of code), or part of a file holding another program or data (for example, one or more scripts stored in a markup language document). The computer program may be deployed to be located and executed on one computer at a single site or to be distributed across multiple sites and executed on multiple computers interconnected over a communication network.

While the present specification contains many details of particular implementations, these should not be construed as limitations on the scope of the invention or what may be claimed, but, rather, should be construed as descriptions of features specific to particular embodiments of the invention. The particular features that are described in the present specification in the context of separate embodiments may be also implemented in combination in a single embodiment. Conversely, the various features that are described in the context of a single embodiment may be also implemented in multiple separate embodiments or in any suitable sub-combinations. Moreover, although features may be described as operating in a certain combination and the certain combination may be claimed as such, one or more features of the claimed combination may be excluded from the combination in some cases, and the claimed combination may be changed to sub-combinations or variations of sub-combinations.

In the same manner, while operations have been described in a particular order in the drawings, this should not be construed as requiring that the operations should be performed in the described particular order or in a sequential order or all the described operations should be performed in order to achieve desirable results. In some cases, multitasking and parallel processing may be advantageous. Furthermore, the separation of various system components in the embodiments described above should not be construed as requiring such separation in all embodiments, and it should be understood that the described program components and systems may be generally integrated together in single software products or packaged into multi-software products.

In accordance with the present disclosure, in order to overcome a problem in which as a communication connection between a terminal device and a beacon device has been established, the beacon device cannot broadcast a beacon signal anymore and thus another terminal device cannot identify the beacon device, a beacon device can release a communication connection immediately after establishing the communication connection and then receiving required data, thereby enabling communication connections with other terminal devices. That is, in accordance with the present disclosure, the connection time between the terminal device of a user and the beacon device is minimized, thereby overcoming the problem in which the beacon device cannot broadcast when the beacon device has connected with an external device.

In accordance with the present disclosure, a beacon device can release a communication connection immediately after establishing the communication connection with a terminal device and then receiving required data, can process the received data, and then can establish a communication connection again with the corresponding terminal device via another type of broadcasting in order to provide notification of the completion of the processing of the data, so that the corresponding terminal device can receive the result of the processing.

Furthermore, if the broadcasting of the beacon device is performed using the method of the present disclosure, a maximum of 20 bytes are available, and thus data (160 bits) for 160 users can be processed.

Accordingly, even when the terminal devices of multiple visiting users pass by a store where a beacon device is installed, the cases where a beacon signal for providing service is missed can be reduced.

The present disclosure relates to a wireless communication system, and an apparatus and method for controlling communication connections with a plurality of user terminals in the system, which are capable of minimizing connection time upon establishing communication connections between a beacon device and a plurality of terminal devices via wireless communication, thereby preventing the plurality of terminal devices from missing beacon signals broadcast by the beacon device.

Furthermore, since the present invention has sufficient commercial potential or sales potential and can be practically and explicitly implemented, the present disclosure has industrial availability.

Although the specific embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A terminal device, comprising:
a communication unit configured to receive a signal broadcast by at least one beacon device, via wireless communication;
a storage unit configured to store data that is transmitted and received to and from the at least one beacon device; and
a control unit connected with the communication unit, and configured to
scan the received signal transmitted from the at least one beacon device,
perform a communication connection with the at least one beacon device using the scanned signal,
receive a bit mask transmitted from the at least one beacon device via the communication unit according to the communication connection,
store the received bit mask in the storage unit,
transmit data to be transmitted to the at least one beacon device via the communication unit, and
immediately release the communication connection,
wherein the bit mask is a value indicative of a sequential position required for a reconnection, and
wherein, when the control unit receives, from the at least one beacon device and via the communication unit, a notification signal providing a notification of completion of processing the transmitted data, the control unit is configured to
check a value of a bit mask included in the received notification signal, and
perform a communication reconnection with the at least one beacon device when the value of the bit mask included in the received notification signal is a value indicative of a case where the terminal device is required to perform the communication reconnection with the at least one beacon device.

2. The terminal device of claim 1, wherein, when the communication reconnection is established in response to the checked value of the bit mask included in the received notification signal, the control unit is configured to:
request a result of processing of the transmitted data from the at least one beacon device via the communication unit; and
release, when the requested result of processing of the transmitted data is received from the at least one beacon device, the communication reconnection with the at least one beacon device.

3. A beacon device, comprising:
a beacon communication unit configured to communicate with at least one terminal device via wireless communication;
a beacon control unit configured to
assign a bit mask,
when a communication connection with the at least one terminal device has been established, transmit the assigned bit mask to the at least one terminal device via the beacon communication unit, and
release the communication connection when data reception from the at least one terminal device via the beacon communication unit is completed; and
a beacon storage unit configured to store data that is transmitted to and received from the at least one terminal device,
wherein the beacon control unit is configured to
store, when the data is received from the at least one terminal device via the beacon communication unit, the received data in a queue of the beacon storage unit,
perform processing of the data stored in the queue,
change a value of the assigned bit mask to a value indicative of a case where a reconnection with the at least one terminal device is required when the processing of the data has been completed, and
broadcast a signal including the changed bit mask, via the beacon communication unit.

4. The beacon device of claim 3, wherein the broadcast signal including the changed bit mask is a signal providing a notification of completion of the processing of the data transmitted from the at least one terminal device.

5. The beacon device of claim 3, wherein, when a communication reconnection with the at least one terminal device has been established and a result of the processing of data is requested by the at least one terminal device via the beacon communication unit, the beacon control unit is configured to
transmit the requested result of the processing of the data via the beacon communication unit, and
release the established communication reconnection with the at least one terminal device.

6. A non-transitory computer-readable storage medium having stored therein computer-readable program instructions that, when executed by a computer, cause the computer to execute a method of controlling communication connections with a plurality of user terminals, the method comprising:
by a terminal device:
executing a module for wireless communication in response to manipulation of a user;
after the module for wireless communication has been executed, scanning a beacon signal, and identifying a beacon device when receiving a beacon signal broadcast by the beacon device;
performing an operation for a communication connection after the beacon device has been identified;
receiving and storing a bit mask required for a reconnection from the beacon device when the communication connection with the beacon device has been established;
transmitting data to be transmitted to the beacon device, and then immediately releasing the communication connection;
receiving a signal providing notification of completion of processing broadcast by the beacon device after the communication connection has been released; and
checking a value of a bit mask included in the received signal, and performing an operation for a communication connection with the beacon device if the value of the bit mask is a value indicative of a case where the terminal device currently requires a communication connection with the beacon device,
wherein the signal providing notification of completion of processing broadcast by the beacon device is a signal which is received as a Generic Attribute Profile (GATT) regarding whether a connection is required and in which the value of the bit mask has been included as "1".

7. The non-transitory computer-readable storage medium of claim 6, wherein the method further comprises:

after performing the operation for a communication connection with the beacon device, requesting a result of processing of the transmitted data when the communication connection with the beacon device has been established; and releasing the communication connection with the beacon device when the result of processing of the data has been received from the beacon device.

8. The non-transitory computer-readable storage medium of claim 7, wherein the method further comprises outputting the result of processing received from the beacon device so that a user can check the result of processing.

\* \* \* \* \*